Oct. 8, 1963 K. J. YOST ETAL 3,105,982
TAPPING MACHINE HAVING TAPPING HEAD AND DRIVE
MEANS ADJUSTABLY MOUNTED ON A SUPPORT POST
Filed July 2, 1958 3 Sheets-Sheet 1

INVENTORS
KENNETH J. YOST
WALTER W. DeLANO
BY
J. Warren Kinney Jr.
ATTORNEY

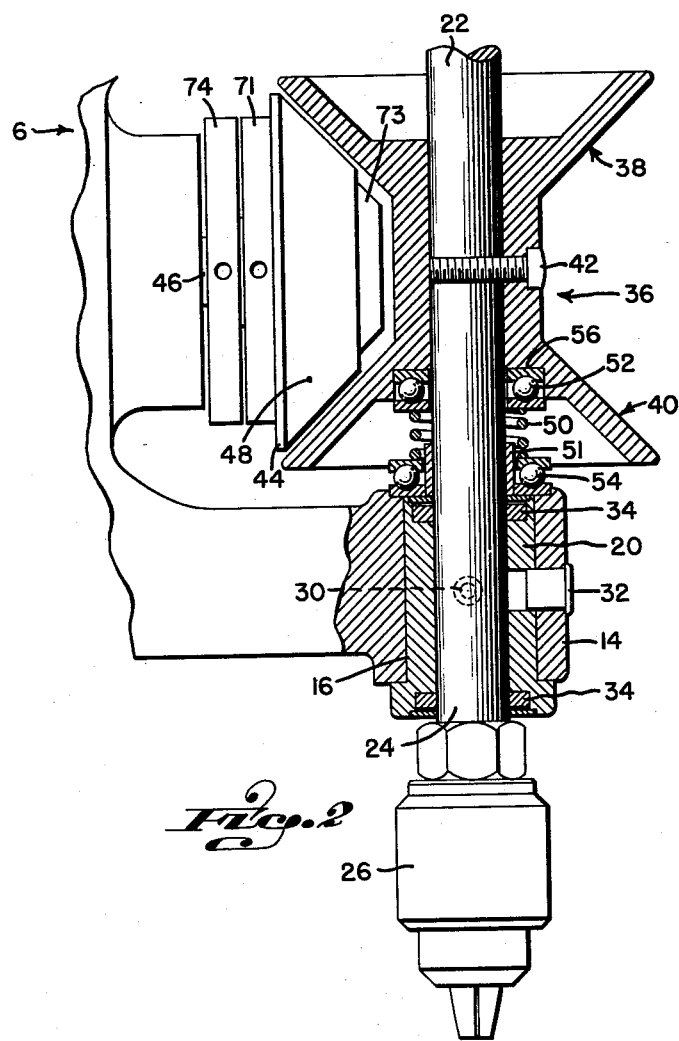

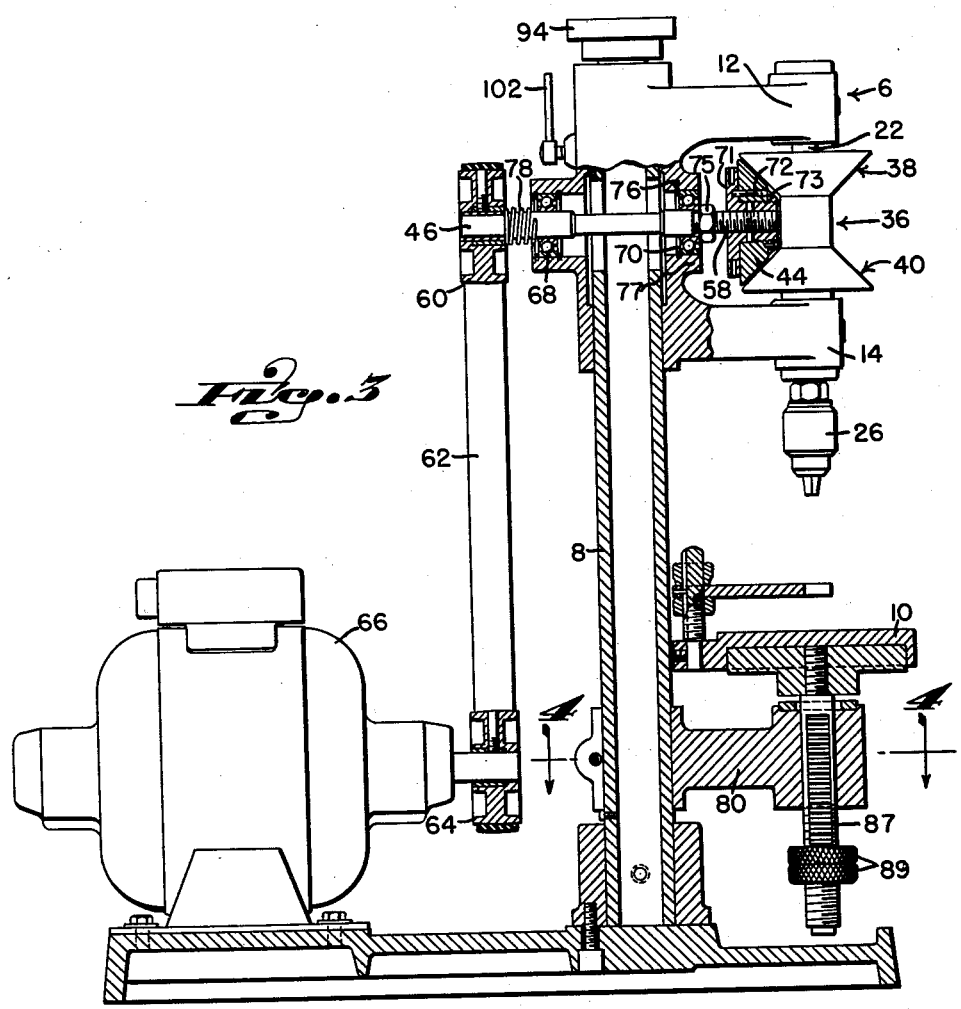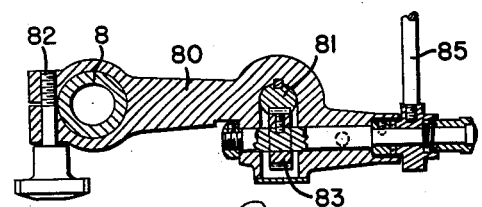

United States Patent Office 3,105,982
Patented Oct. 8, 1963

3,105,982
TAPPING MACHINE HAVING TAPPING HEAD AND DRIVE MEANS ADJUSTABLY MOUNTED ON A SUPPORT POST
Kenneth J. Yost, Oxford, and Walter W. De Lano, Fairfield, Ohio, assignors to The Hamilton Tool Company, Hamilton, Ohio, a corporation of Ohio
Filed July 2, 1958, Ser. No. 746,143
2 Claims. (Cl. 10—129)

This invention relates to a tapping machine, and in particular to a supersensitive tapping machine in which almost imperceptible axial movement of the tapping spindle above or below a normal, neutral position will result in the spindle being rotated in one or the other of two directions.

An object of the invention is to provide a tapping machine, having the hereinabove described characteristics, with means for supporting the tapping spindle in a normal, neutral position whereby a double cone secured to and carried by the spindle will automatically be positioned in a neutral, non-contacting relationship with reference to the upper and lower faces of a drive cone which is continuously rotated in one direction incident to operation of the machine.

Another object of the invention is to provide simple, yet highly effective means for permitting controlled, endwise, axial translation of the shaft to which the drive cone is secured relative to the double cone of the spindle shaft.

A further object of the invention is to provide means for selectively adjusting the head of a tapping machine relative to an upright column upon which the head is mounted for altering the relationship between a driven pulley on the drive-cone-shaft and the drive pulley of a drive motor.

These and other means are attained by the means described herein and disclosed in the accompanying drawings, in which:

FIG. 2 is a fragmentary detail view showing the head of the machine in vertical section on an enlarged scale.

FIG. 3 is a view somewhat similar to FIG. 1, showing a modification of the device.

FIG. 4 is a sectional view taken on line 4—4 of FIG. 3.

Figure 1:
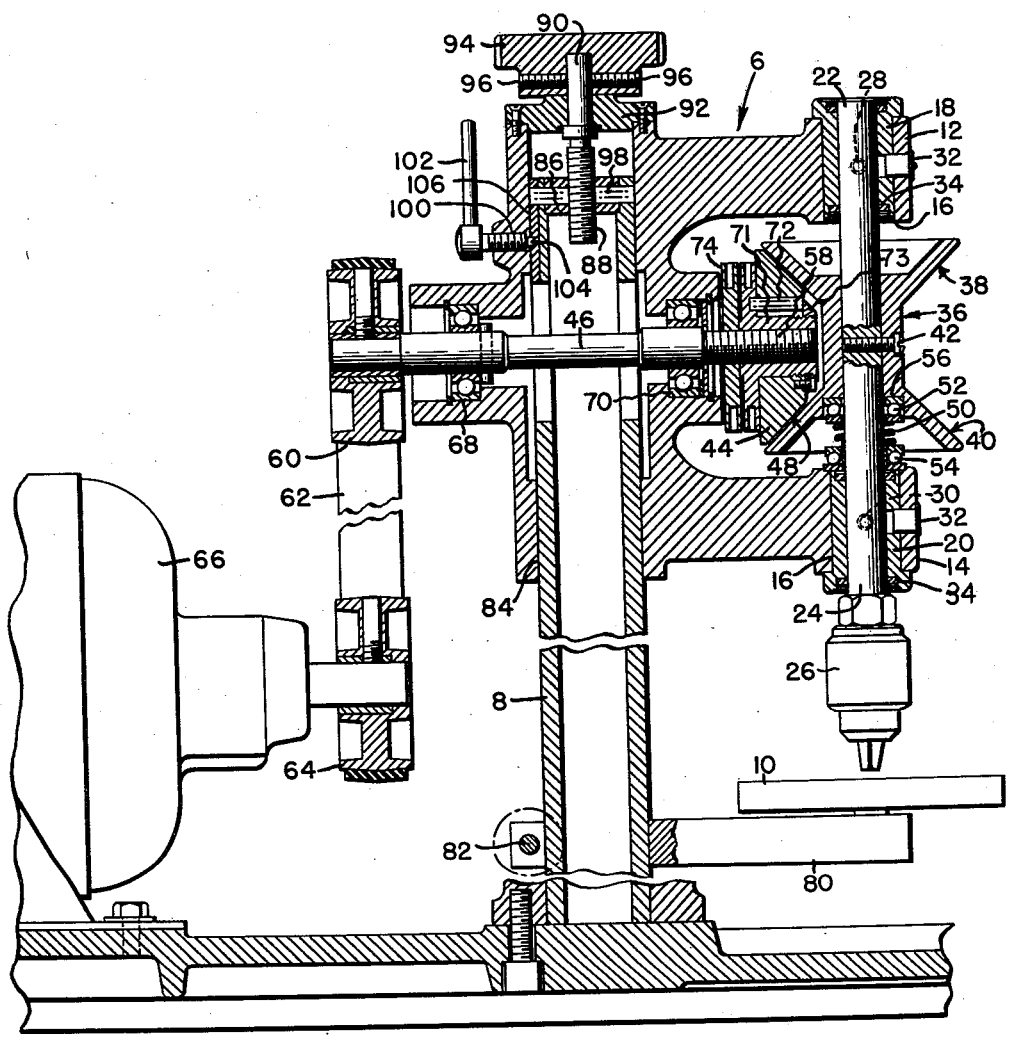
FIG. 1 is a fragmentary vertical cross-sectional view of a tapping machine embodying the improved head of the present invention.

Common practice in the tapping of workpieces has usually involved feeding of the tapping spindle, or of the workpiece, by means of a definite manual step additional to positioning the tap relative to the workpiece. That is, it was customary for the machinist to use both hands in positioning the workpiece for tapping, and then remove one hand from the workpiece in order to manually advance the tap to the workpiece for starting the operation. While in some tapping operations the tap was brought to operating position by means of a foot lever or treadle, the procedure still involved a separate operation which subjected the machinist to unnecessary fatigue.

According to the present invention, the machinist is relieved of the separate conscious operation of bringing the tap to the work following the work-positioning step, and as a result, production is markedly increased. These advantages, amongst others mentioned herein, are attained by the improvements about to be described.

With reference to the drawings, the numeral 6 indicates generally a head, carriage or bracket which may be supported upon a post 8 for vertical adjustment relative to a work table 10, which may also receive support from the post 8. The head 6 may include a pair of spaced arms 12 and 14 provided with vertically aligned bores 16 receptive of a pair of aligned spindle bearings 18 and 20. A spindle 22 is journaled in bearings 18 and 20 for rotation and for limited axial shifting movement, the spindle having an end 24 upon which is mounted a chuck or holder 26 for a tool such as a threading tap, not shown.

The characters 28 and 30 indicate set screws or similar fasteners for fixing the bearings 18 and 20 within the bores of their respective bracket arms; oilers for the bearings are indicated at 32. Oil seals are shown at 34.

Upon the spindle intermediate the arms 12 and 14 is fixedly mounted a driven means or element 36 which may be in the form of an axially bored spool, as shown. The driven means or spool has spaced end portions developed to provide a pair of opposed conical heads provided with annular friction faces 38 and 40 disposed angularly to one another. The spool may be fixed to the spindle in any suitable manner, as by means of a screw 42. The spool or driven means 36 is rotatable bodily with the spindle, and will move therewith also in vertical, endwise, axial directions of shifting movement when necessary.

The spindle 22 will be rotated through the agency of spool 36, by means of a driving wheel 44 which may be in the form of a truncated cone axially mounted upon a drive shaft 46. The driving wheel or cone 44 has an annular friction face 48 adapted to be contacted by one or the other or neither of the friction faces 38 or 40 of the driven means or spool 36, for selectively rotating the spindle in one or the other of opposite directions.

Spindle 22 accordingly will be rotated in one direction by shifting it axially upwardly, to effect a driving relationship between the driving wheel 44 and the conical frictional face 40 of the driven element or spool 36, this being the natural result of elevating a workpiece against a tap carried by the chuck 26. Contrariwise, downward withdrawal of a workpiece upon completion of the tapping operation, results in downward shifting of the spindle, which places the conical frictional face 38 of the spool 36 in driving contact with cone 44, to reverse the spindle rotation for withdrawal of the tap from the workpiece.

The spindle and its associated driven means or spool 36 have a neutral or home position, at which the driving wheel rotates freely between the spool faces 38 and 40 without contact therewith. In the home position, therefore, the driving wheel may rotate while the spindle remains at rest. The clearance between the friction face 48 of the driving wheel 44, and the friction faces 38 and 40 of the driven means or spool 36, is preferably very limited in the neutral or home position of the spindle, since the maximum overall endwise travel of spindle 22 is in the neighborhood of $\frac{1}{64}$ to $\frac{1}{16}$ inch.

To assure a positive, dependable, non-driving relationship between the driving and driven members while the machine is not tapping, means is provided for normally maintaining the spindle at a proper elevation to preclude contact of the driven means or spool 36 with the driving wheel 44. Such means may be in the form of a compression spring 50 or equivalent resilient device, acting constantly to counter-balance the weight of the spindle, its associated spool 36, chuck 26, and a tap carried thereby (not illustrated) to neutral or home position. As best illustrated in FIG. 2, the spring 50 may surround the spindle 22 and a spacer sleeve 51 above the bearing 20, and is by preference flanked by anti-friction thrust bearings 52 and 54 abutting the arm 14 and the lower face 56 of the spool or driven means 36.

It should here be noted that the spring and thrust bearings may be duplicated at the upper end of spool 36, in the event that the machine is to be used in a position other than the vertical-spindle position; the important consideration being that means shall be provided for yieldingly urging the spindle and spool 36 always to a home position as previously explained.

The driving shaft 46 should be so journaled in head or bracket 6 as to dispose the shaft in coplanar relationship to the spindle axis, and by preference, at approximate right angles thereto. One end 58 of the shaft may be directed toward the spindle axis, whereas the opposite end may carry a fixed pulley 60 driven by means of a belt 62 trained over the drive pulley 64 of an electric motor 66. Bearings for the drive shaft 46 are indicated at 68 and 70.

In order to compensate for wear of the friction faces of the driving and driven members 44 and 36, it is desirable to provide means for fixing the drive shaft 46 in selected positions of axial adjustment, thereby to reduce the normal space between the friction faces of the driving wheel 44 and the driven means of spool 36. This adjustment may be performed in accordance with FIG. 2, or preferably in accordance with FIG. 3.

In FIG. 1, 71 indicates an adapter threadably applied to the threaded end 58 of drive shaft 46, and carrying the driving wheel or cone 44 which is fixed to the adapter as by means of a pin 72. A nut 73 secures the parts 71 and 44 against axial separation. A lock nut 74 applied to the threaded portion of shaft 46 is adapted to bear against adapter 71 to lock the adapter and the driving wheel or cone 44 in predetermined axial position upon shaft 46.

To adjust the driving wheel or cone 44 for wear of its friction face 48, it is necessary only to loosen the lock nut 74 and then rotate the adapter 71 on the threaded end of the drive shaft, to advance the assembly 44—71 toward the driven member or spool 36 until the desired clearance with the spool is obtained. The assembly 44—71 may then be locked in the new adjusted position by means of nut 74.

It should be noted that in the construction illustrated in FIG. 2, drive shaft 46 is fixed against endwise axial movement and that adjustment of the driving wheel 44 toward or away from spindle 22 is effected by rotating or altering the axial relationship between said wheel and the shaft upon which it is mounted.

With particular reference now to FIG. 3, a preferred form of means for adjusting the driving wheel 44 relative to spindle 22 is disclosed, wherein the driving wheel is fixedly secured to the drive shaft 46 and wherein the shaft itself is shiftable axially endwise for presenting the driving wheel to spool 36. In other words, the driving wheel or cone 44 is non-adjustably fixed upon the drive shaft 46, and the shaft itself is bodily shiftable axially toward and from the driven means or spool 36, for clearance adjustment of the friction faces. In this form of construction, the drive shaft may be shifted axially through the inner races of the bearings 68 and 70, toward and from the driven spool 36, by simply rotating the nut 75 in one direction or the other on the threaded portion 58 of shaft 46, it being noted that the axial face of the nut remote from spool 36 abuts against the outer face of the inner race of bearing 70 whereas the outer race of said bearing abuts against retainer ring 76 seated within a complementary groove in boss 77 of head 6.

A spring 78 is disposed around the other end of shaft 46 between complementary faces of pulley 60 and the rear face of the inner race of bearing 68 for normally exerting an axial endwise force on shaft 46 which urges said shaft away from spindle 22. From the foregoing, it is apparent that rotation of nut 75 in one direction will literally pull shaft 46 out of boss 77 against the counterforce of spring 78 for advancing said shaft and the driving wheel or cone 44 toward spindle 22. In this manner the concentricity of cone 44 and shaft 46 is not disturbed or altered incident to adjustment of cone 44 relative to spindle 22 and spool 36 carried thereby.

Although in the use of the tapping machine for light work, the table 10 may be unnecessary, such table, if needed, may be supported upon an arm 80 mounted upon the post 8. The table arm may be slidably clamped to the post, as at 82, or if desired, it may be elevated and lowered by the common expedient of a quick-action rack 81 and pinion 83 elevator, FIG. 4, actuated through lever 85. If desired, as best illustrated in FIG. 3, means such as a threaded shaft 87, having stop nuts 89 thereon, may be provided for limiting the upward travel of table 10.

When a belt drive, rather than a chain or gear drive, is used for rotating the drive shaft 46, the machine preferably is furnished with a belt-tightener. In accordance with the present disclosure, means are provided, note FIG. 1, for bodily shifting the bracket or head 6 lengthwise of post 8, to adjust the tension of belt 62. To this end, head 6 is made slidable along post 8 at the bracket bore 84, and the top of the post may be provided with a stationary nut 86, the thread of which is engaged by the external thread 88 of a stud 90 rotatably supported by an apertured cap 92 fixed across the top of bracket bore 84. A hand wheel or knob 94 may be fixed to the upper end of stud 90, as by means of set screws 96, so that upon rotation of the hand wheel or knob in one direction or the other, the bracket may be bodily elevated or lowered upon the post 8 to adjust the tension of belt 62. The character 98 indicates a pin whereby the nut 86 is firmly retained within the open upper end of post 8.

The numeral 100 indicates a clamp screw provided with a handle 102 whereby the elevation of the bracket upon the post may be fixed, following adjustment. The inner end 104 of the clamp screw may bear against a friction shoe or pad 106 carried by the upper end portion of the post, as a means of attaining firm clamping action.

In the light of the disclosure herein, it should be at once evident that the invention provides for exceptionally rapid tapping operations involving no conscious effort on the part of the machinist in starting and stopping the tapping spindle between tapping operations. The improved tapping machine is simple and inexpensive of construction, and is designed to render efficient trouble-free service with great economy and convenience.

It is to be understood that various modifications and changes may be made in the structural details of the machine, within the scope of the appended claims, without departing from the spirit of the invention.

What is claimed is:

1. A tapping machine comprising, in combination, a supporting post, a tapping head having a tubular barrel portion slidably receiving one end portion of said post and slidably adjustable thereon, said head including a pair of spaced laterally extending arms integral with said barrel and having outer ends provided with aligned bores parallel to said barrel, axially aligned bearings in said bores, other axially aligned bearings supported by and upon opposite sides of said barrel in axially perpendicular relation to the axis line of the first mentioned bearings, a drive shaft supported by said other bearings and extended through a transverse opening in said post, said opening being elongated in the longitudinal direction of the post to permit adjusting movement of said shaft in said direction, a spindle supported by said first mentioned bearings and being adapted at one end to carry a threading tool, a friction spool on said spindle and having opposed friction faces, said drive shaft having one end directed toward said spool and terminating between said friction faces thereof, a friction wheel on said one end of the drive shaft and having a conical friction surface closely adjacent to said spool friction faces, spring means encircling the spindle between an end of said spool and an arm yieldingly maintaining said spool with the friction faces thereof out of contact with the said friction surface of said friction wheel, means for applying rotary motion to said drive shaft, means for axially moving said friction wheel for adjusting the spacing between the friction surface thereof and the friction faces of said spool, a thrust means between and coupling the barrel and post at one end for applying axial thrust to the barrel to slidably adjust the position of the entire head on the post, and means for locking the post and barrel against relative movement by said thrust means.

2. The invention according to claim 1, wherein said thrust means comprises a nut secured to the said one portion of said post, a cap secured to an end of said barrel in spaced opposed relation with said nut, a stud having a threaded end portion passing through and in threaded connection with said nut and having an opposite end portion extending through and freely rotatable with respect to said cap, and a knob secured to said opposite end portion of the stud and bearing upon the side of the cap remote from said nut whereby the stud may be rotated for applying the said axial thrust to the barrel and effect the said slidable adjustment of the head on the post.

References Cited in the file of this patent

UNITED STATES PATENTS

| | | |
|---|---|---|
| 802,524 | Ray | Oct. 24, 1905 |
| 1,160,607 | Housel | Nov. 16, 1915 |
| 1,525,134 | Hubbell | Feb. 3, 1925 |
| 1,602,504 | Readey | Oct. 12, 1926 |
| 1,666,135 | Hall | Apr. 17, 1928 |
| 1,880,405 | Broecker | Oct. 4, 1932 |
| 1,945,326 | Marchal | Jan. 30, 1934 |
| 2,237,905 | Haffling | Apr. 8, 1941 |
| 2,294,231 | Graves | Aug. 25, 1942 |
| 2,608,699 | Csencsics | Sept. 2, 1952 |
| 2,690,084 | Van Dam | Sept. 28, 1954 |
| 2,912,871 | Velkoff | Nov. 17, 1959 |

FOREIGN PATENTS

| | | |
|---|---|---|
| 153,534 | Australia | Oct. 7, 1953 |